United States Patent [19]

Dumais

[11] Patent Number: 5,754,426

[45] Date of Patent: May 19, 1998

[54] INSTRUMENT DESCRIPTOR (ID) MONITOR SYSTEM

[75] Inventor: John Dumais, Fort Collins, Colo.

[73] Assignee: Hewlett-Packard Co., Palo Alto, Calif.

[21] Appl. No.: 580,550

[22] Filed: Dec. 29, 1995

[51] Int. Cl.⁶ .................................................. G06F 19/00
[52] U.S. Cl. ........................ 364/188; 345/340; 345/970; 364/579
[58] Field of Search ........................ 364/188, 189, 364/191, 192, 193, 579, 580, 578, 481–487; 395/965–970, 340, 343, 344, 345, 346, 347, 348, 349, 406

[56] References Cited

U.S. PATENT DOCUMENTS

| | | | |
|---|---|---|---|
| 4,914,568 | 4/1990 | Kodosky et al. | 395/970 X |
| 5,361,336 | 11/1994 | Atchison | 395/970 X |
| 5,437,007 | 7/1995 | Bailey et al. | 395/970 X |
| 5,479,643 | 12/1995 | Bhaskar et al. | 395/970 X |
| 5,485,600 | 1/1996 | Joseph et al. | 395/970 X |

*Primary Examiner*—Joseph Ruggiero

[57] ABSTRACT

A system and method for controlling instrumentation, continuously reflecting the state of instrumentation, and for automatically updating the state of the instrument. A system and method to monitor instrument states in a graphical user environment.

11 Claims, 16 Drawing Sheets

INSTRUMENT DESCRIPTOR (ID) MONITOR SYSTEM

CROSS-REFERENCE TO OTHER APPLICATIONS

The following applications are of common assignee and contain some common disclosure.

"A To/From Socket Object," Ser. No. 08/581,123, filed Dec. 29, 1995, pending, incorporated herein by reference in its entirety;

"Callable VEE," Ser. No. 08/581,124, filed Dec. 29, 1995, pending, incorporated herein by reference in its entirety;

"A Multi-Device Direct I/O Object," Ser. No. 08/581,118, filed Dec. 29, 1995, pending, incorporated herein by reference in its entirety;

BACKGROUND OF THE INVENTION

1. Field of the Invention

The present invention relates to a graphical user interface. In particular, the present invention pertains to an instrument descriptor monitor system operating in a graphical user environment.

2. Related Art

HP VEE is a graphical programming language that allows a user to express a graphics image in a high level language. In many instances, in order to write a program to make a computer perform a particular task, a user would have to write a complex set of computer instructions. In a graphical programming language such as HP VEE, the user writes a program by connecting images or icons together using a mouse. The resulting computer display resembles a data flow diagram or a block diagram.

The data flow diagram created in HP VEE is representative of a program to test a piece of electronic equipment. For example, an engineer may be using HP VEE to test a video cassette recorder (VCR) for proper operation. In such a case, the engineer must control instrumentation such as an oscilloscope or a waveform analyzer in order to test the VCR circuitry. As mentioned above, in order to control the instrumentation, the engineer writes a set of very detailed instructions and sends them to the instrumentation.

The engineer also would be responsible for maintaining the knowledge of the current state of the instrument because many instruments have interrelated measurement subsystems. If the engineer wants to vary the vertical channel on an oscilloscope, for example, a corresponding adjustment to the horizontal channel is required. Conventionally, the engineer would have to understand the interrelationship between the two channels and adjust the horizontal channel physically by hand or programmatically through an application such as HP VEE.

This is problematical because some designers make instruments that do not have front panel controls, but are controlled by an interface bus. When the process of determining the state of an instrument is manual, someone must physically observe the instrument to determine the state. This involves either extra persons to perform the observation function, or a delay in the testing procedure if the engineer were performing the observation.

What is needed, therefore, is an environment where a person can write a program to control instrumentation and to continuously reflect the current state of the instrumentation without having to write a program using a complex set of computer instructions.

SUMMARY OF THE INVENTION

The present invention is an instrument descriptor monitor system having a visual interface to instrument controls, and which allows human user interaction without the user having to manage instrument communications or to track instrument state.

The present invention is directed to a system and method for controlling instrumentation, continuously reflecting the state of instrumentation, and for automatically updating the state of the instrument. The instrument descriptor (ID) monitor system includes an ID monitor window, an ID monitor context, at least one ID monitor, and at least one ID monitor state object. The invention operates in a graphical user environment by presenting a menu to a user and then receiving from the user a request to present a ID monitor in the graphical user environment. The invention retrieves and presents to the user a list of available ID monitors. The invention then receives a request from the user for a particular ID monitor selected from the list to be presented in the graphical user environment. The invention honors the request by presenting the ID monitor in the ID monitor window and enabling automatic updating. When the invention receives a user request to instantiate automatic updating, the invention polls the list of available ID monitors to determine eligibility for automatic updating, and updates the eligible ID monitors. The invention then reflects (or displays) the current instrument values.

One feature of the ID monitor system is that it provides a visual interface to instrument controls and allows for human (or user) interaction at a high level. This feature allows a user to monitor instruments states in a graphical user environment rather than by observing the instruments themselves. The user can alter the state of an instrument without physically contacting the front panel of the instrument. This feature is advantageous in situations where instrumentation is located in an area that is remote from the user. Additionally, this feature is advantageous where instruments have little or no front panel controls, such as VXI modules.

Another feature of the ID monitor system is that it permits a user (either manually or programmatically) to alter one subsystem of an instrument without having to make corresponding changes to any other interdependent subsystems. The application program flow or the user can vary the controls and settings on a plurality of instruments and the invention automatically updates the instrument state and reflects the current state in the graphical user environment. This feature is advantageous when a user is debugging a program being written using a graphical programming language such as HP VEE.

BRIEF DESCRIPTION OF THE FIGURES

The invention is best understood by reference to the figures wherein references with like reference numbers indicate identical or functionally similar elements. In addition, the left-most digits refer to the figure in which the reference first appears in the accompanying drawings in which.

DETAILED DESCRIPTION OF THE PREFERRED EMBODIMENTS

The instrument descriptor (ID) monitor system operates in the main window of a graphical programming application such as HP VEE. The ID monitor system includes an ID monitor window, an ID monitor context, a ID monitor for each piece of instrumentation (or instrument) and an ID monitor state object for each subsystem and control of the instrument associated with the individual ID monitor.

Implementation of the ID monitor system is divided into two broad categories: the components that present the visual interface and allow for human interaction, and the components that manage instrument communications and track instrument state. This division is termed the model/view paradigm. In the model/view paradigm, the model handles graphics and user interaction with the graphical user environment. The view handles information and performs calculations. A view has only one model, and maintains a link to its associated model. Each model has a dependent. A dependent is a component that requires an input from its corresponding model in order to perform its predetermined function. A model may have any number of dependents, including zero. In this way, a model behaves similar to a central repository for any number of current views.

Figure 2:
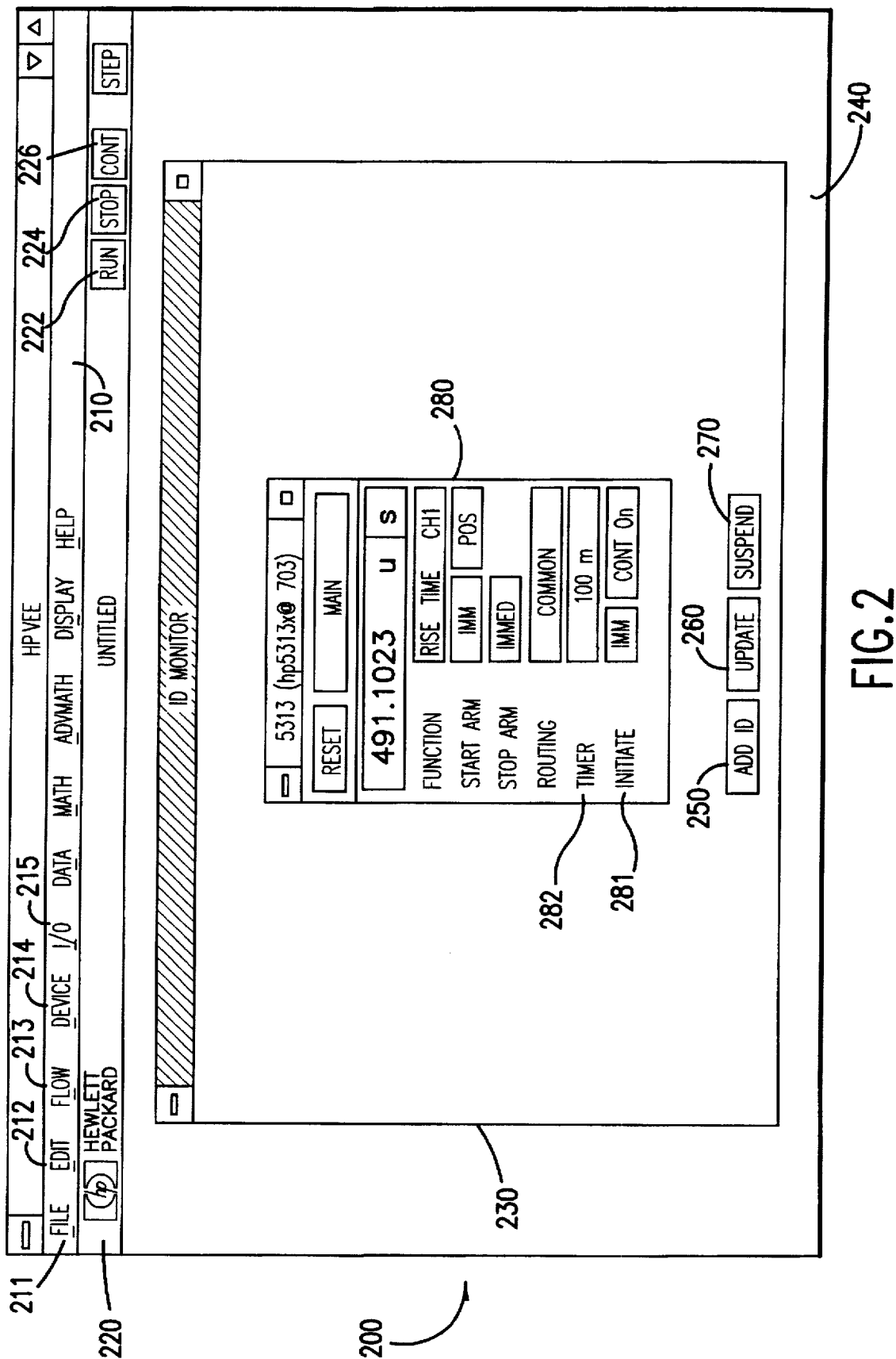
FIG. 2 illustrates a typical window display of the graphical user environment in which the present invention operates.

The ID monitor system operates in graphical user environment 200 of FIG. 2. ID monitor window 230 is the view for graphical user environment 200. The view for ID monitor window 230 is ID monitor 280.

Figure 1:
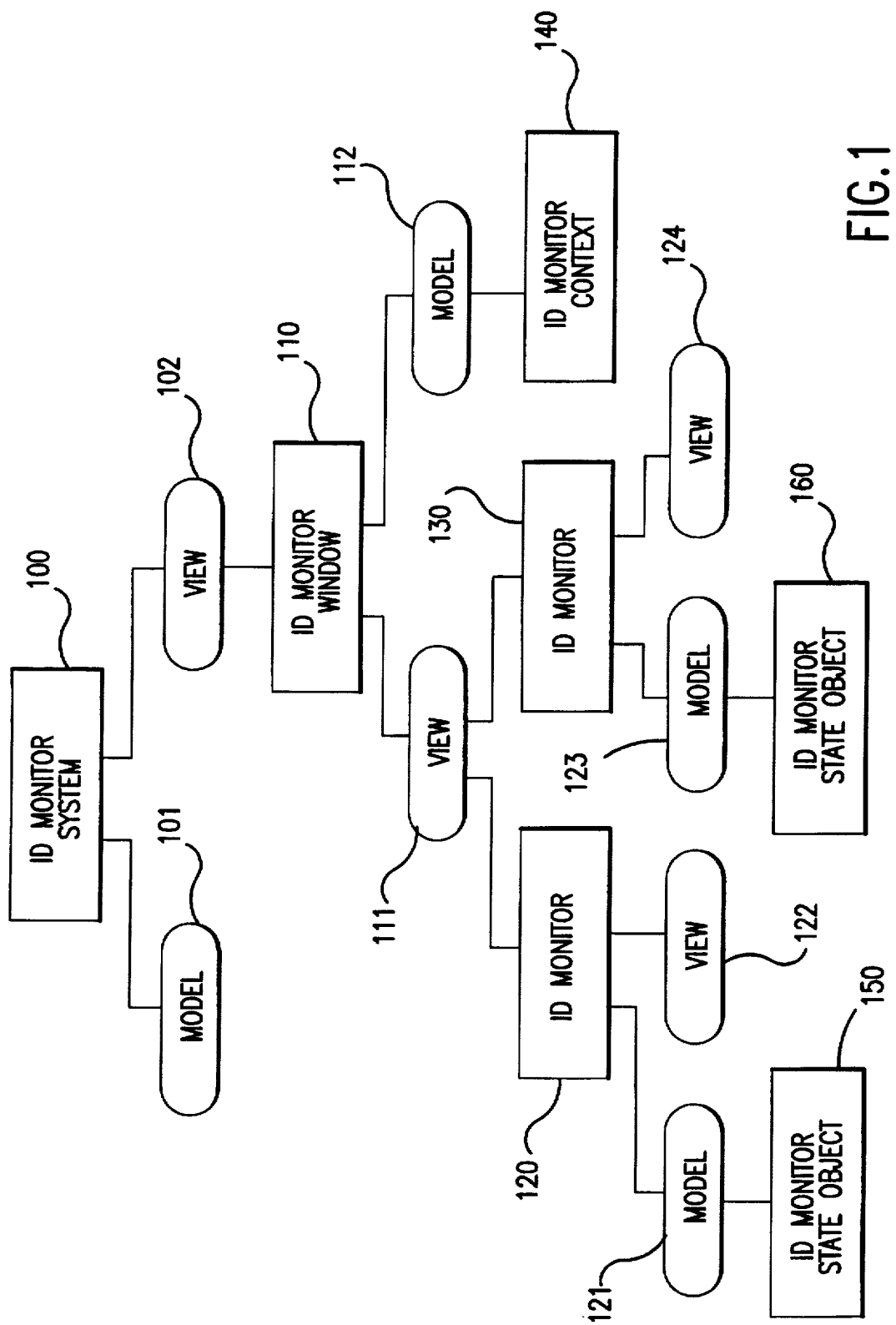
FIG. 1 illustrates a model/view paradigm of the present invention.

The view for ID monitor system 100 is ID monitor window 110, as illustrated in FIG. 1. The model for ID monitor window 110 is ID monitor context 140. The view for ID monitor window 110 can be any number of ID monitors such as ID monitors 120, 130 or 280. The model for an ID monitor can be any number of ID monitor state objects such as ID monitor state objects 150 and 160.

FIG. 2 illustrates a typical window display of the graphical user environment in which the present invention operates. Graphical user environment 200 in a preferred embodiment is similar to HP VEE. Graphical user environment 200 includes menu bar 210, which includes the names of the menu items available to a user. As is the case with conventional graphical user environments, the menu items under menu bar 210 can be displayed by positioning a mouse pointer (not shown) over the desired menu name and clicking the mouse button to pull down available menu items. Likewise, menu items can be displayed by performing certain keystrokes in a known manner.

Graphical user environment 200 includes toolbar 220, ID monitor Window 230, and work area 240. In order to display ID Monitor Window 230 in work area 240, the user clicks the mouse button and pulls down menu item ID Monitor. ID Monitor 230 then appears in work area 240.

Figure 4:
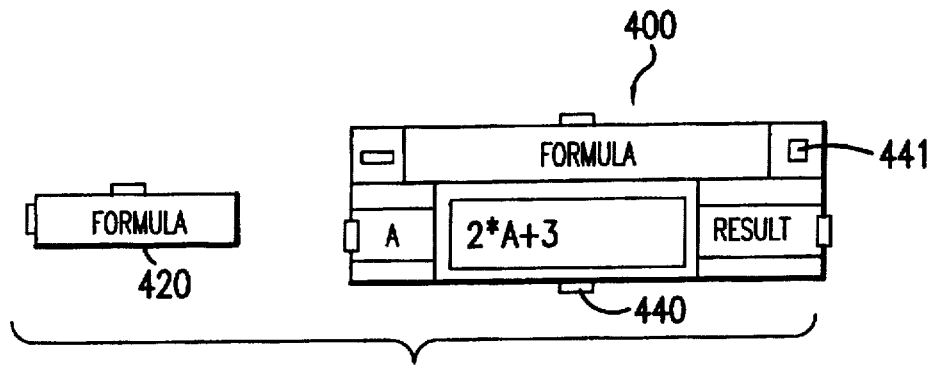
FIG. 4 illustrates the iconic view and the open view of HPVEE graphical user environment.

HP VEE displays ID monitor window 230 in either iconic view or open view, as shown in FIG. 4. Operating in iconic view 420 conserves space in work area 240 and makes HP VEE programs (or flow charts) more readable. Operating in open view 440 provides more detail and allows the user to edit the internals of ID monitor window 230. To switch from open view 440 to iconic view 420, the user clicks on dot 441 with the mouse button. To return to open view 440, the user double clicks with the mouse button on iconic view 420. When ID monitor window 230 is in icon view, clicking the right mouse button (not shown) causes ID monitor object menu 330 to be displayed in work area 240.

Figure 3:
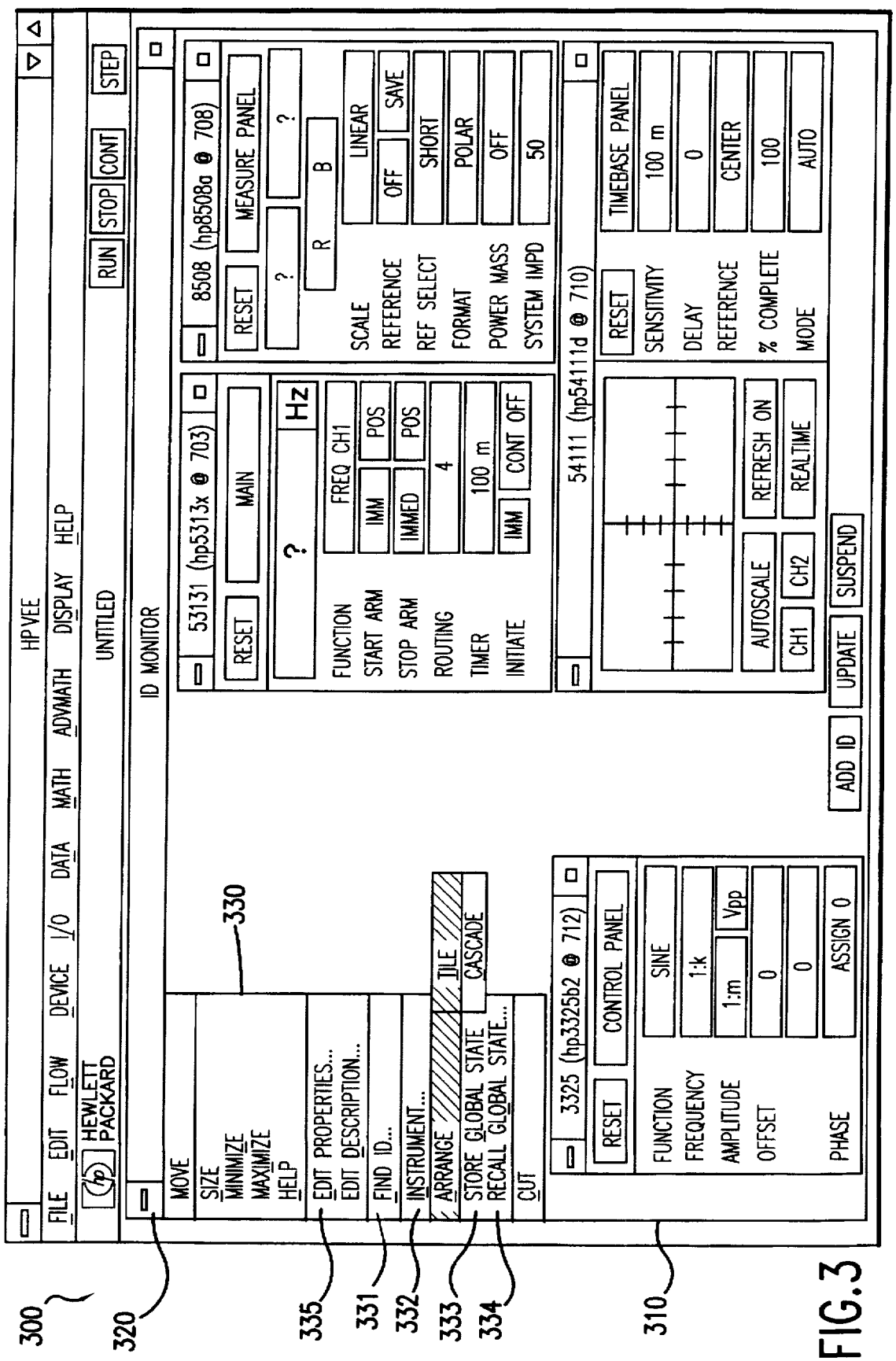
FIG. 3 illustrates a pull down menu of an ID monitor window.

FIG. 3 shows the object menu 330 of ID monitor window 230. Object menu 330 contains a plurality of entries that apply to ID monitor window 230 as an entity or to all of the monitor IDS as a group. One of the entries in object menu 330 is Find ID 331. When the user selects Find ID 331, the user is presented with a list of ID monitors currently in ID monitor window 230. Selecting one of the ID monitors in the list moves the ID to the upper left corner of ID monitor window 230 and puts it in its open view. This allows a user to quickly locate an ID when it becomes difficult to quickly identify the ID monitor of interest.

Figure 5:
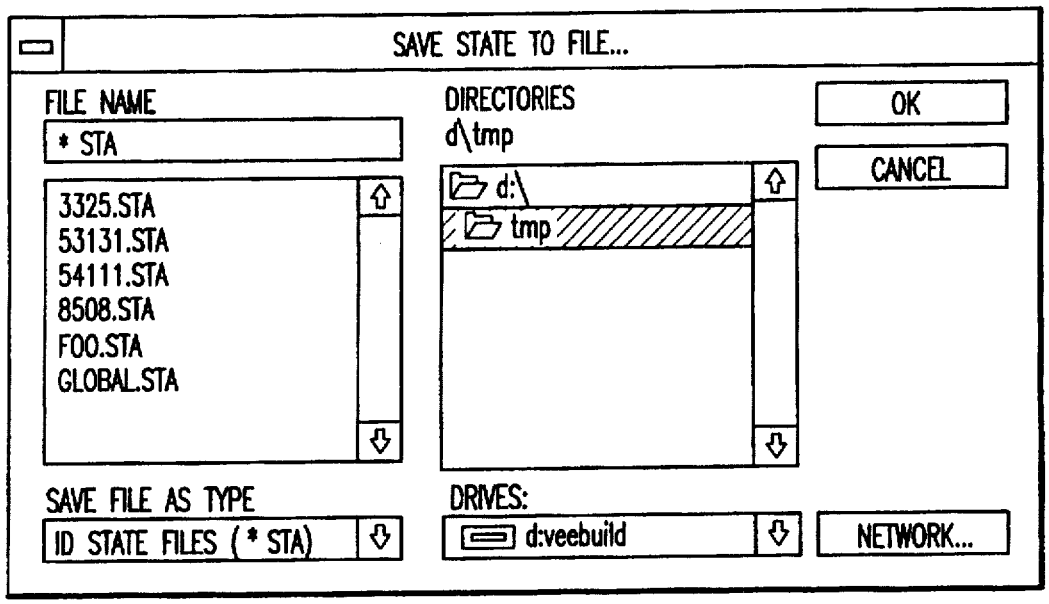
FIG. 5 is a typical window display of a save file dialog box.
Figure 6:
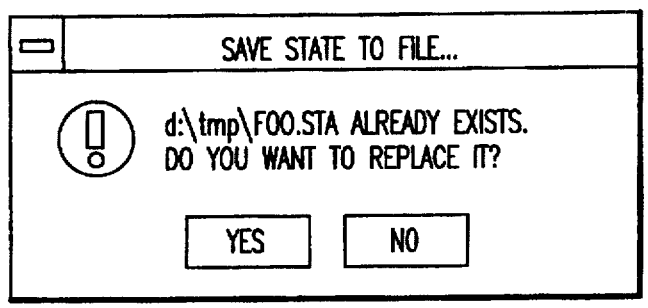
FIG. 6 illustrates a caution dialog box.
Figure 7:
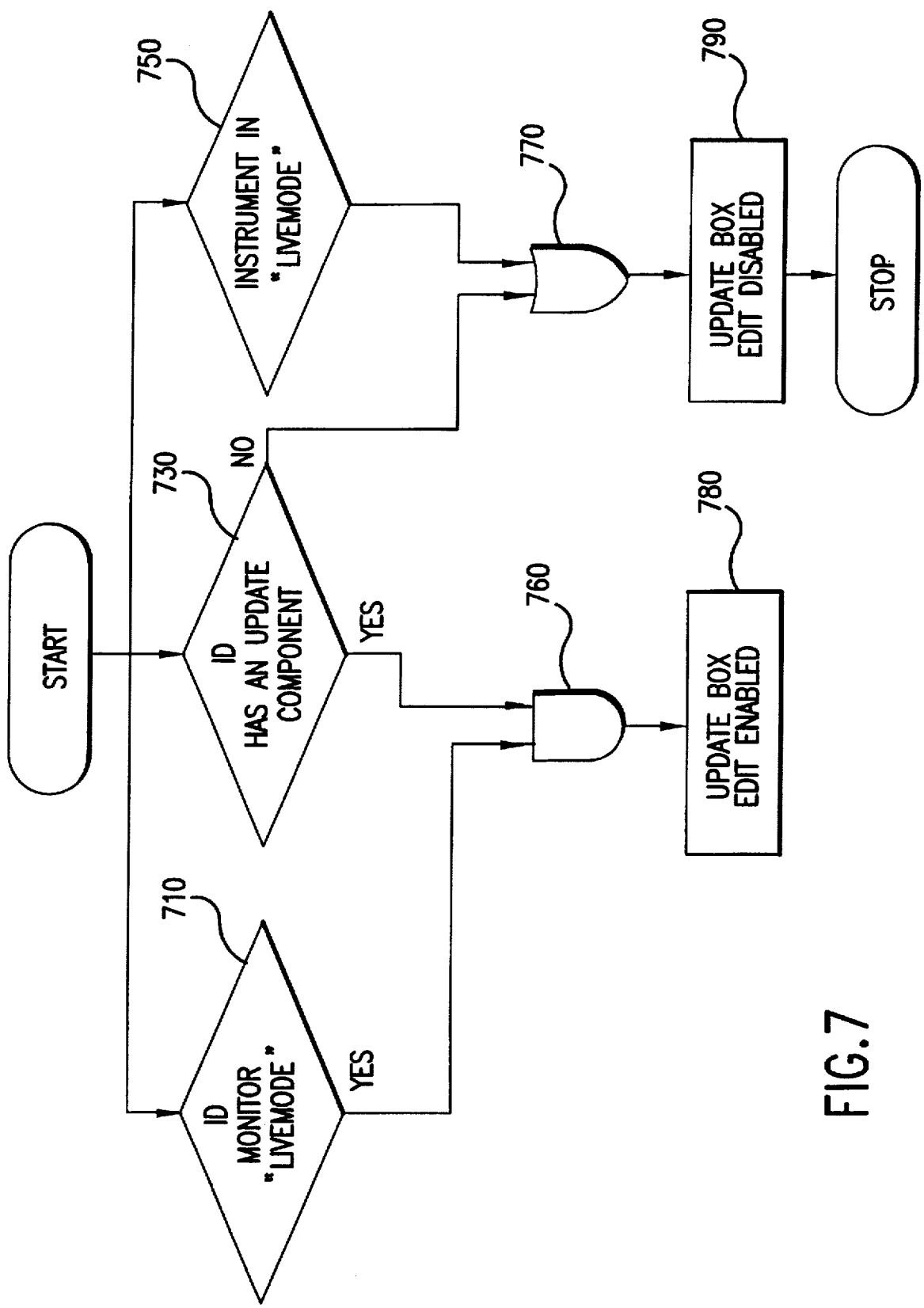
FIG. 7 is a schematic diagram illustrative of the process of enabling the Auto-update box.

Another entry in object menu 330 is Store Global State 333. When the user selects this menu entry, ID monitor window 230 creates a file to hold the information required to return each ID monitor to the state it was in at the time the user chose to store the instrument states. The user selects the file where state data is to be saved by using the Save State to File . . . dialog box of FIG. 5. If the user selects a file that already exists, the caution dialog box of FIG. 6 is displayed.

Figure 8:
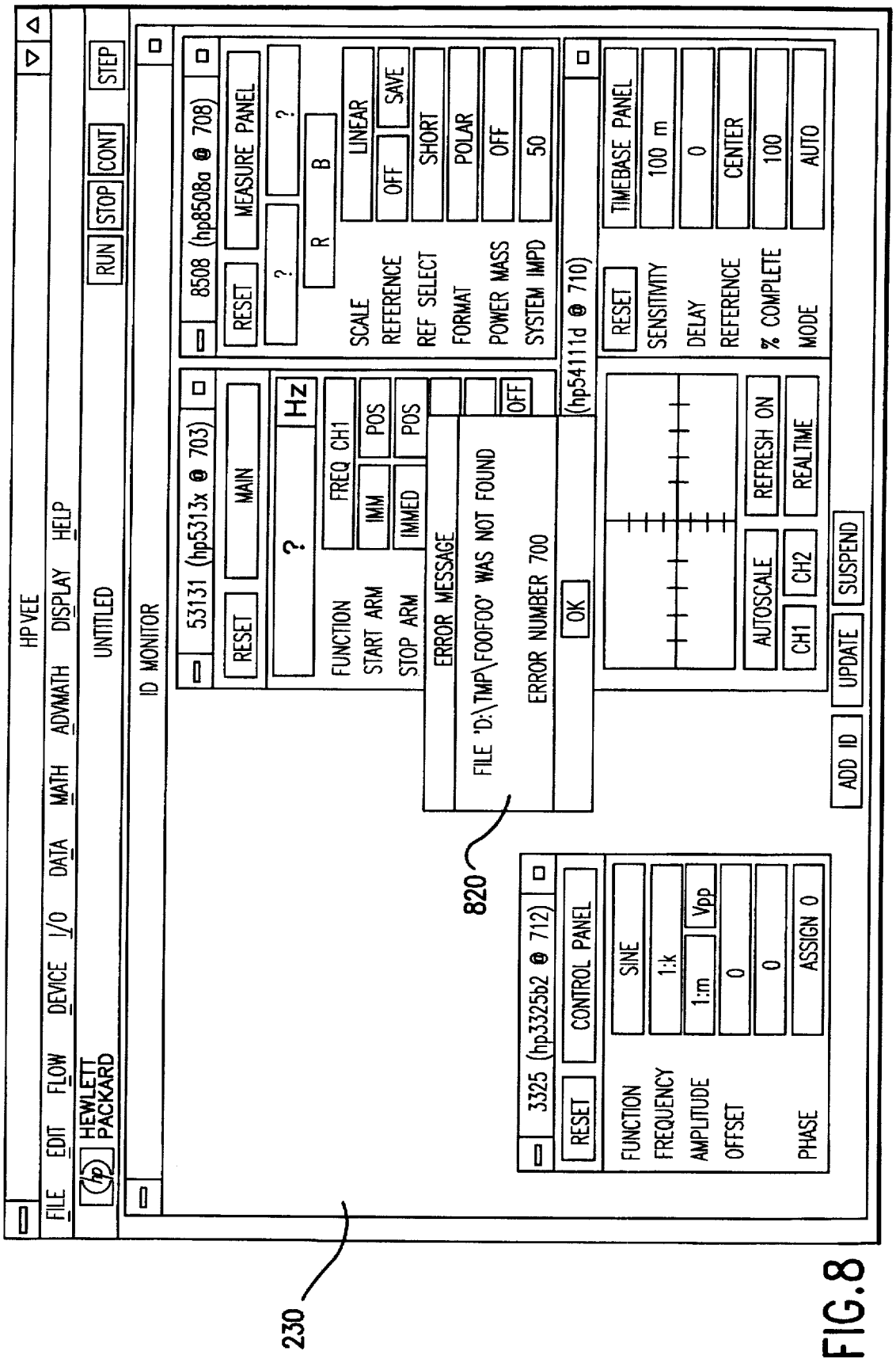
FIG. 8 illustrates an error message.

Another entry in object menu 330 is Recall Global State 334. When the user selects Recall Global State 334, ID monitor window 230 reads a file to retrieve the information necessary to set ID monitor 280 to the state it was in when the user chose to save its state. The state of each ID monitor that is currently displayed in ID monitor window 230 and that has an entry in the state file is then set to the state saved in the file. Each ID monitor that has an entry in the state file, but which is not currently in ID monitor window 230 is added to ID monitor window 230 and has its state set to the state previously saved in the state file. Monitor ID monitors in ID monitor window 230 that have no associated entry in the state file are unaffected by selecting Recall Global State 334. Moreover, selecting Recall Global State 334 does not change the size or position of ID monitors already in ID monitor window 230. ID monitor window 230 positions newly created ID monitors based on a positioning algorithm. If the desired file cannot be located, the user is presented with the error message similar to 820 as depicted in FIG. 8.

Figure 9:
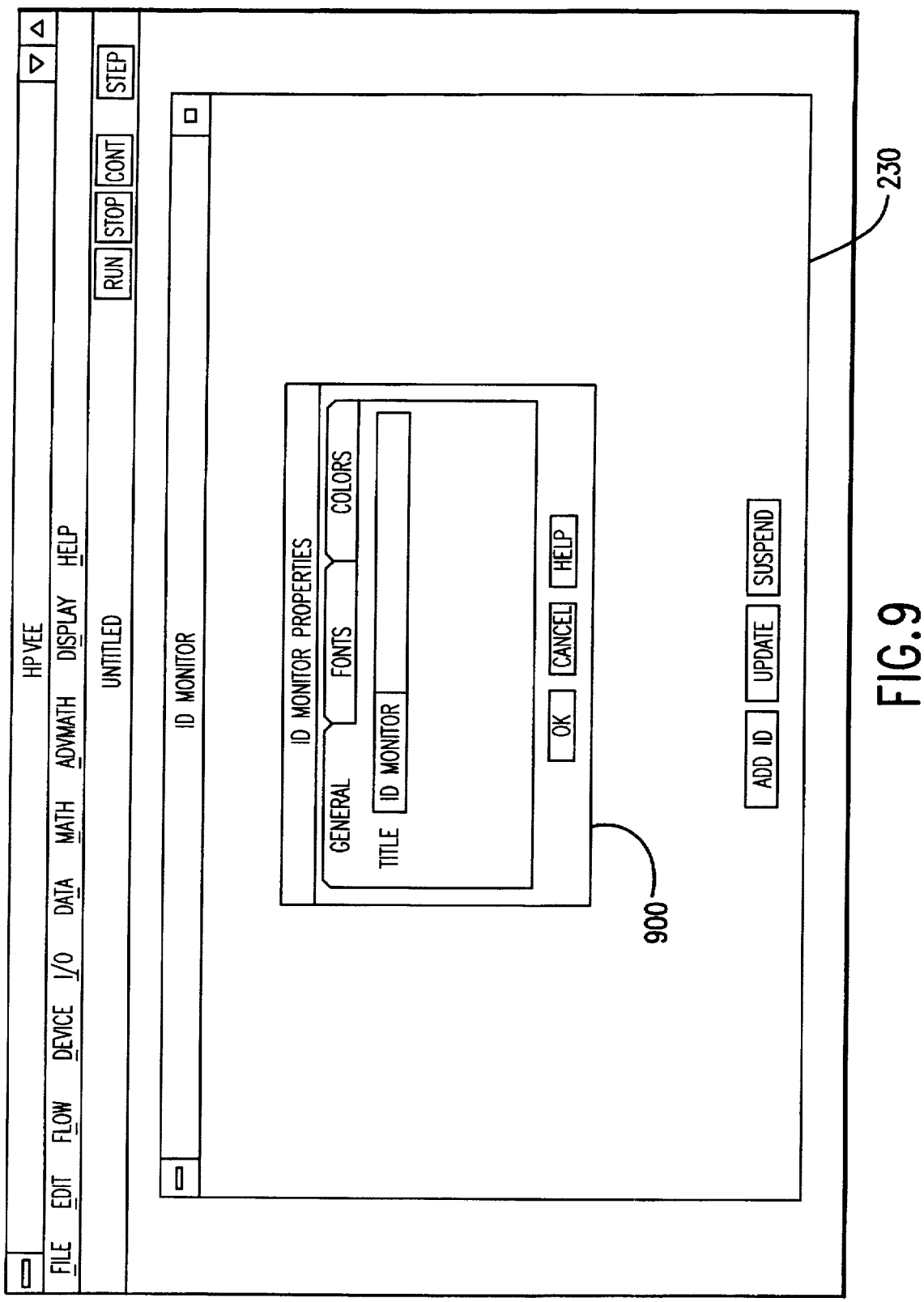
FIG. 9 illustrates a dialog box.

Another entry in object menu 330 is Edit Properties . . . 335. When the user selects Edit Properties . . . 335, ID Monitor Properties dialog box 900 appears in ID monitor window 230 as depicted in FIG. 9. The user cannot control the background color of ID monitor window 230 using ID Monitor Properties dialog box 900.

ID monitor window 230 is the main visual interface to an ID monitor such as 280. ID monitor window 230 manages all user interactions that govern the behavior of an ID monitor in ID monitor window 230. ID monitor window 230 includes Add ID button 250, Update button 260, and Suspend button 270. These buttons will be described later in more detail.

ID monitor window 230 manages the geometry of all ID monitors contained in ID monitor window 230. As the user moves the ID monitor window 230, ID monitor window 230 must adjust the geometries of each of the contained ID monitors. This adjustment is necessary to ensure that the ID monitors maintain the same position relative to ID monitor window 230 and to other ID monitors contained in ID monitor window 230.

ID monitor window 230 also maintains a list of all ID monitors which it contains. As the user moves ID monitor window 230, ID monitor window 230 informs each ID monitor on the list that it must change its position by the amount that ID monitor window 230 has moved. In addition, ID monitor window 230 is aware of its own position with respect to graphical user environment 200.

ID monitor window 230 contains all of the individual instruments that a user may add to the ID monitor system. ID monitor window 230 is a dependent to ID monitor context 140. Thus, in order to store and recall the state of an instrument, as described above, ID monitor window 230 requires information from ID monitor context 140.

ID monitor context 140 handles information and performs the calculations required for ID monitor system 100 implementation. ID monitor context 140 maintains knowledge of graphical user environment 200 instrument resources, maintains knowledge of which ID monitors are contained in ID monitor window 230, and manages automatic updates of instrument state.

ID monitor context 140 keeps track of all instrument resources available to the application in which ID monitor window is operating. If the application is HP VEE, ID monitor context 140 maintains a file history of all instruments available to the user. ID monitor context 140 communicates with the application to determine the availability and configuration of a given instrument. The file has an entry for whether an instrument has a corresponding ID, or whether the instrument is in LIVE MODE. This is because HP VEE allows a user to build a program that references an instrument, even if the instrument is not available. For example, a user may not physically have the instrument, or the instrument is temporarily not connected to the computer on which HP VEE is running. In this case, the user can turn off LIVE MODE. The HP VEE program will still function, but will not attempt to communicate with the instrument. The file also has an entry for whether the instrument has an UPDATE component. The UPDATE component is typically supplied with the instrument as delivered to the user. The entries corresponding to LIVE MODE and UPDATE component are required in order for ID monitor context 140 to enable ID monitor window 230 to graphically reflect the availability and capability of the instrument.

ID monitor context 140 also maintains the status of the contents of ID monitor window 230. It dynamically updates the status to ensure that the ID monitor window 230 contents are accurate.

ID monitor context 140 keeps track of which ID monitors are eligible for automatic updates. In so doing, ID monitor 140 prevents the application or user from altering the state of an instrument at the same time ID monitor window 230 is trying to perform an automatic update of the instrument. Automatic updating is described in more detail later.

ID monitor 280 is the view that allows a user to interact with a particular instrument. (For purposes of simplicity, only one ID monitor is described.) It reflects the current state of its associated instrument. ID monitor 280 can be used within HP VEE and as a separate utility. Additionally, ID monitor 280 supports instrument state store and recall feature, which is particularly useful in manufacturing functional testing to check instrumentation at a glance.

ID monitor 280 is also responsible for all of the remaining user interface management tasks that deal specifically with the options associated with the given ID. An ID is a convenient abstraction in HP VEE. HP VEE application program requests that the operating system of the computer "open" an instrument when needed. The operating system will bind an ID to a specific instrument as soon as the application opens the instrument.

The ID monitor object menu 1120 has entries to facilitate task management, and is described in detail later.

When the user selects ID monitor 280, from I/O pull down menu 215, ID monitor 280 is automatically displayed in ID monitor window 230. This automatic placement facilitates automatic updates.

Figure 10:
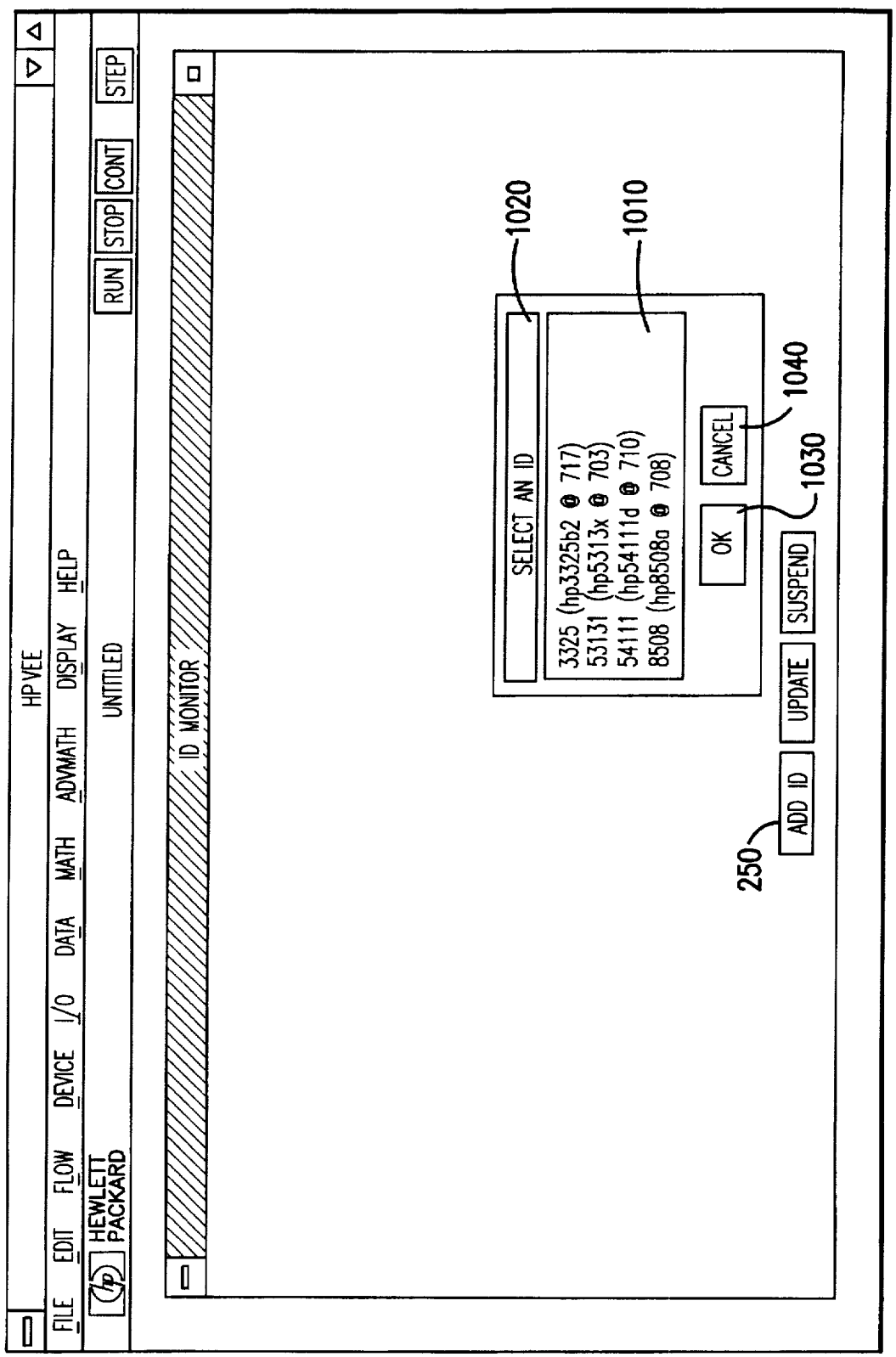
FIG. 10 illustrates a typical list of instruments supported by the present invention.

In order to display ID monitor 280 in ID monitor window 230, the user clicks Add ID button 250. When the user performs this action, the user will be presented with list 1010 as depicted in FIG. 10, of the ID monitors currently available to the use. List 1010 includes the logical names assigned to instruments which have an ID file associated with them and which are not already displayed in ID monitor window 230.

ID monitor 280 has ID monitor window 230 as its only dependent. Moreover, the user may place in ID monitor window 230 only one ID monitor for a given instrument. To do otherwise is redundant because an ID monitor always reflects the current state of its associated instrument.

Figure 11:
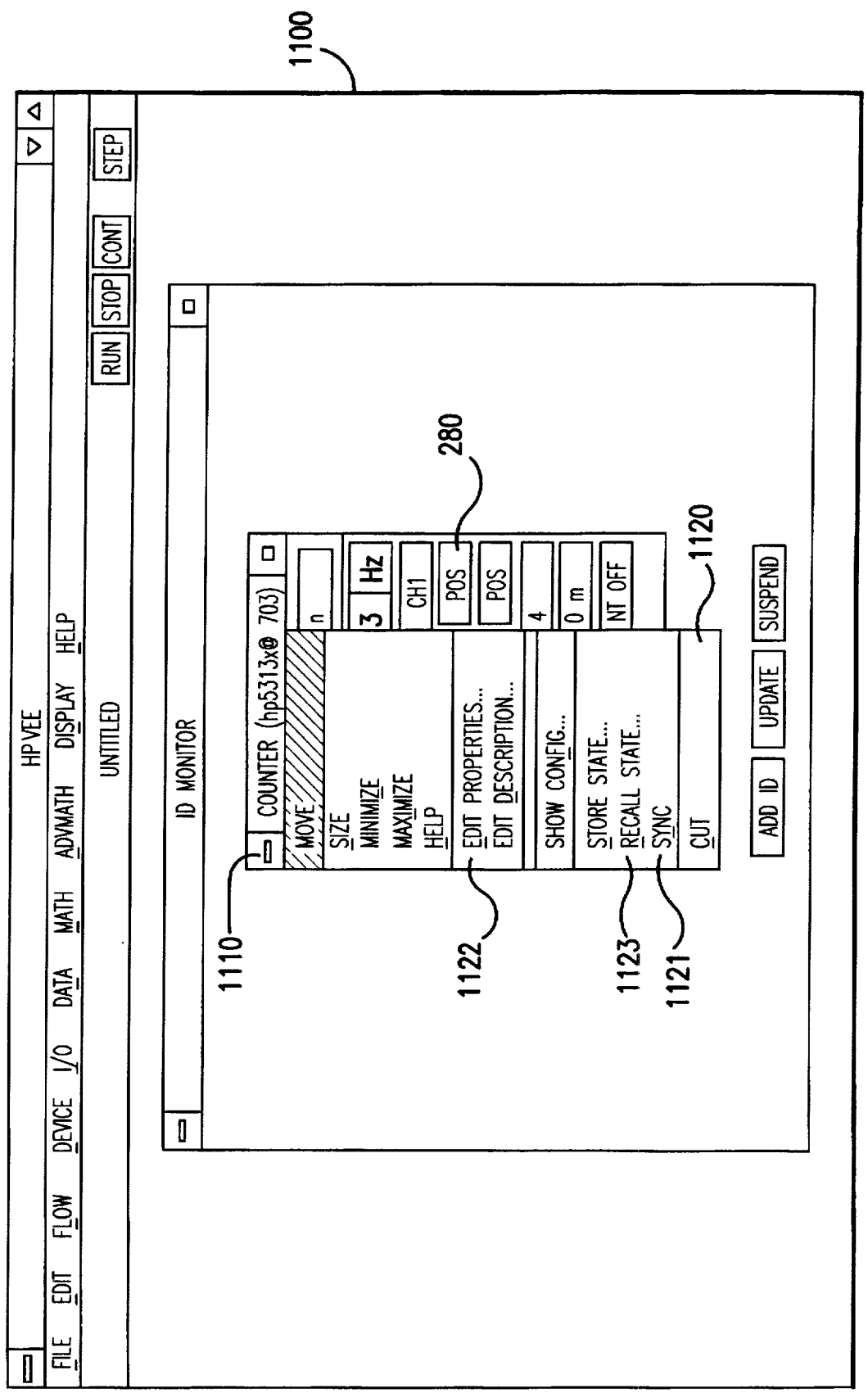
FIG. 11 illustrates an ID monitor pull down menu.
Figure 12:
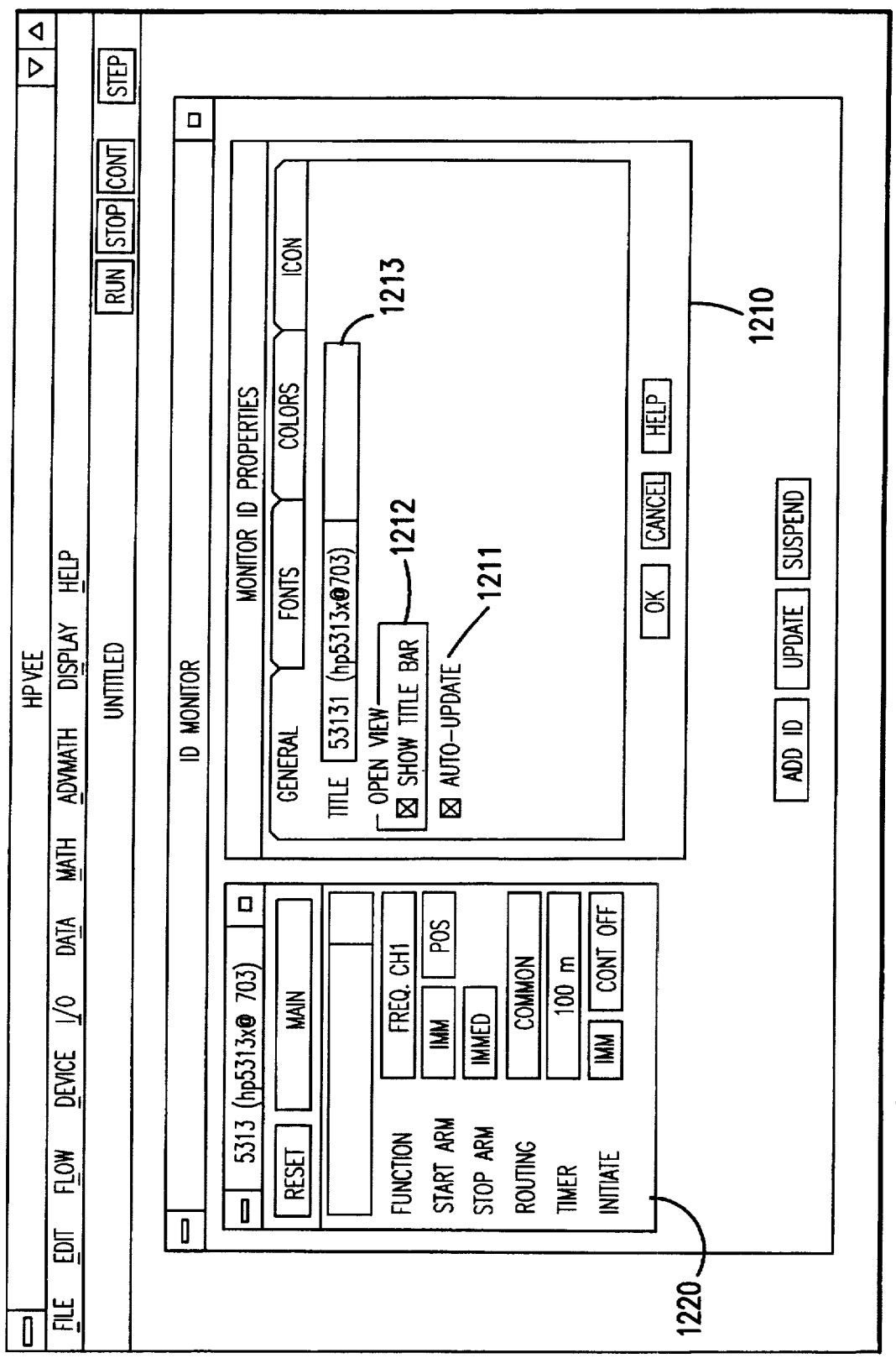
FIG. 12 illustrates an ID monitor Edit Properties dialog box with the Auto-update box in an edit enabled state.

FIG. 11 illustrates pull down menu 1120 of ID monitor 280. Menu entry Sync 1121 is an immediate action selection which causes the ID to mimic the state of its associated instrument. Each ID monitor has a Sync object menu entry. This entry allows the ID to read the dynamic state of the instrument and to use that state to present the current instrument setting to the user. For this menu entry to be active, ID 280 must be configured with LIVE MODE on. Second, ID 280 must have a SYNC component. A SYNC component is a piece of intelligence that allows an ID monitor state object to ask the instrument what its current settings are. The ID monitor state object then adjusts the values in each of the data structures which reflect the state of some subsystem in the instrument to match the instrument.

Sync 1121 from the perspective of an ID refers to the ID's SYNC component. For ID monitors that incorporate a SYNC component, the user may choose to synchronize the state held in the ID monitor to the state the instrument is in. Sync 1121 is active when the ID monitor has a SYNC component, ID monitor window 230 is not automatically updating the ID monitors, and the ID monitor has been configured with LIVE MODE on. Nonetheless, an ID monitor will not track instrument state changes made using another process. This is because two processes may not be able to synchronize ID states between themselves. In that case, the user must write cooperative programs.

In addition to synchronizing instrument states, ID monitor object menu ID monitor 280 also determines eligibility for an instrument to participate in automatic updating, described later, and stores and recalls instrument states. The user can store the state of an individual instrument to a file. That file can later be used to restore the instrument to that saved state. The information in the saved file is split into two sections, similar to the information stored in the section of a global state file. When recalled, each control or display in the ID monitor instructs its corresponding component in the associated model to set the corresponding instrument to the value contained in the state file.

In order to accomplish automatic updating, synchronizing and, and store/recall functions, however. ID monitor 280 must communicate with an ID monitor state object similar to ID monitor state objects 150 and 160.

An ID monitor state object is the model for an ID monitor. Each control or display present on the ID monitor is associated with a component in the corresponding ID monitor state object. As the user interacts with a control or display, the appropriate message is sent to the model. The model, in turn, sends the appropriate instructions to the instrument and retrieves the instrument's responses. The ID monitor includes data structures that represent each of the subsystems and controls that comprise the corresponding instrument. Each of the data structures acts as the model for the plurality of controls that appear in the ID monitor. For example, ID monitor 280 includes timer 282 control and initiate 281 control.

When the user interacts with a control on the ID monitor, that control sends a message to its model indicating that some action should take place within the instrument's corresponding subsystem. Those actions can be one of set, get, or execute. Set sets the instrument's given subsystem to the value contained in the ID monitor control. Get reads the instrument's subsystem and reflects that value in the ID monitor control. Execute performs some action on a given instrument subsystem. This action may or may not update the visual portion of an ID monitor control.

The ID monitor state object maintains the information regarding the corresponding ID's participation in automatic updates. This information is supplied to the corresponding ID monitor when the Edit Properties dialog box 1122 is displayed, and is changed when the user changes the state of Auto-update check box 1211.

The ID monitor state object, when instructed to save the current state of the corresponding instrument, writes the values of all its components to the appropriate section of that part of the file reserved for storing individual instrument states. The value of each component reflects the state of the corresponding instrument subsystem at the time the instrument state is stored.

When instructed to recall a state, the ID monitor state object sends the appropriate instructions to the instrument to set the corresponding subsystem to the value contained in the state file.

Figure 13:
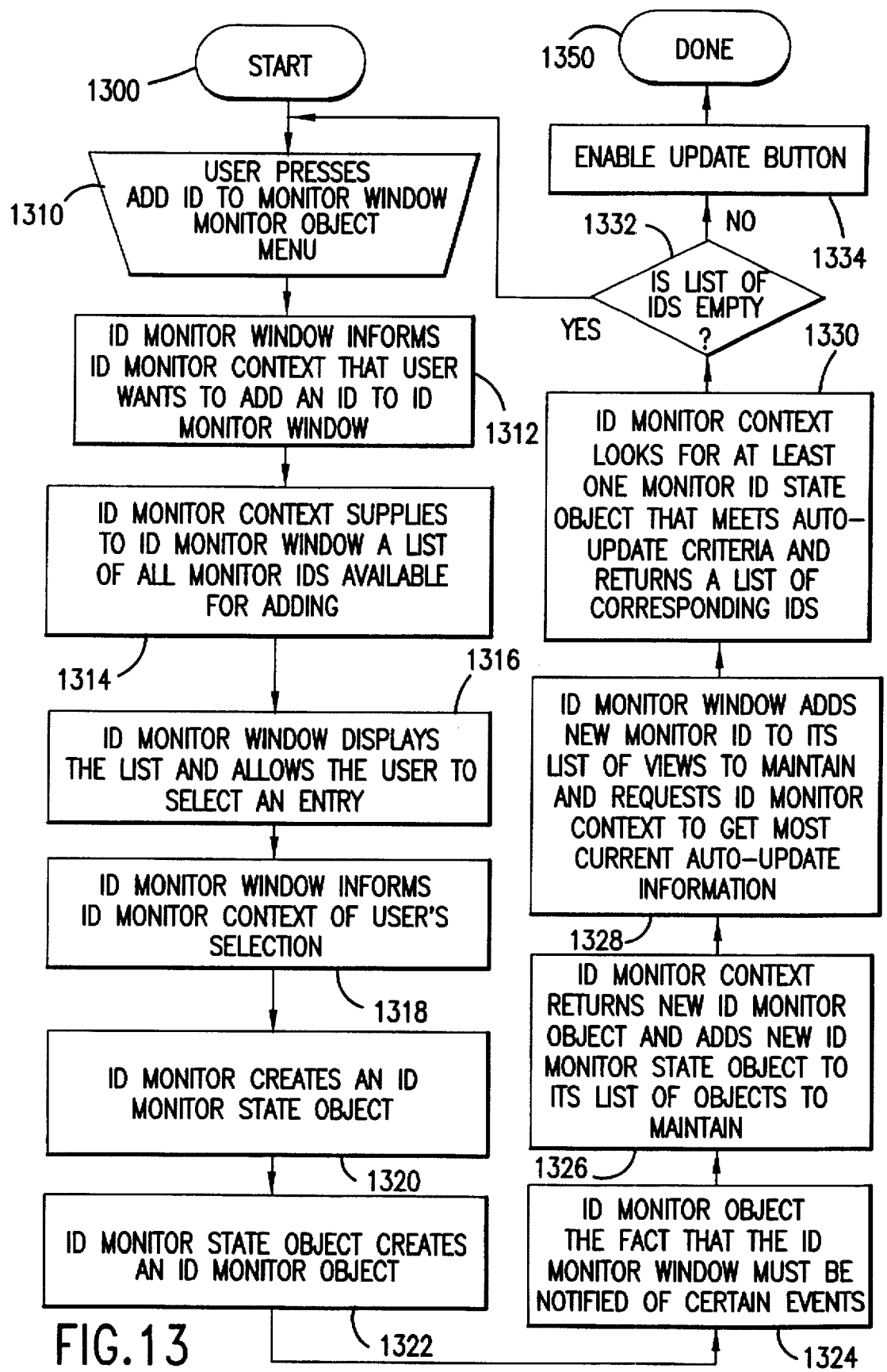
FIG. 13 is a flowchart of the process of adding an ID to the ID monitor window.

As the user adds ID monitors to or deletes ID monitors from ID monitor window 230. ID monitor context keeps track of the ID monitor state objects currently contained in the ID monitor system. ID monitor context dynamically updates its information to ensure that any request from the ID monitor window will always result in an accurate representation of those ID monitor contents. FIG. 13 is a flowchart of the process of adding an ID monitor to ID monitor window 230. The flow chart in FIG. 13 begins with step 1300, where control immediately passes to step 1310.

In step 1310, the user clicks on Add ID button 250 with the mouse to indicate a desire to place an ID monitor in ID monitor window 230. ID monitor window 230 receives a signal from the user that represents the desire to add an ID to ID monitor window. Add ID button 250 allows a user to display ID monitor 280 in ID monitor window 230. Clicking on Add ID button 250 displays a list of instruments 1010. List of instruments 1010 contains an entry for each instrument which is currently defined in IO configuration file, which has an associated ID file name in IO configuration file, and which is not already displayed in ID monitor window 230.

In step 1312, in response to the user request to add an ID monitor to ID monitor window 230. ID monitor window 230 sends a message to ID monitor context 140 which indicates that the user wishes to add an ID monitor to ID monitor window 230.

In step 1314. ID monitor context 140 transfers a file listing to ID monitor window 230. In the case of HP VEE, the file listing includes all of the instruments to which a user has access. Additionally, the file listing enumerates whether the given instrument has an ID associated with it, whether the given instrument is in LIVE MODE, and whether the given instrument has an UPDATE component. This information is needed to allow the ID monitor window to reflect visually the availability and configuration of a given instrument, and to prevent the attempted communication with an instrument that cannot respond. ID monitor context 140 then accesses and retrieves a a file listing of all ID monitors available to the user Id monitor context 140 preferably performs step 1312 by accessing the information saved while the invention performed Store Global State 333.

In step 1316, ID monitor window 230 displays the list and allows the user to select an entry.

In step 1318, ID monitor window informs ID monitor context 140 of the user's selection.

In step 1320, ID monitor creates an ID monitor state object.

In step 1322, ID monitor state object creates an ID monitor object.

In step 1324, ID monitor object registers the fact that the ID monitor window must be notified of certain events.

In step, 1326, ID monitor context 140 returns new ID monitor object and adds new ID monitor state object to its list of objects to maintain.

In step 1328, ID monitor adds new ID monitor to its list of views to maintain and requests ID monitor context to get the most current auto-update information.

In step 1330, ID monitor context 140 looks for at least one ID monitor state object that meets auto-update criteria and returns a list of corresponding ID monitors.

In step 1332, if the list of corresponding ID monitors is not empty, ID monitor window 230 enables Update button 250. If the list is empty, the invention returns to step 1310 and waits for another user request to add an ID monitor to ID monitor window 230.

The operation of the flowchart in FIG. 13 is complete after step 1332, as indicated by step 1350.

Figure 14:
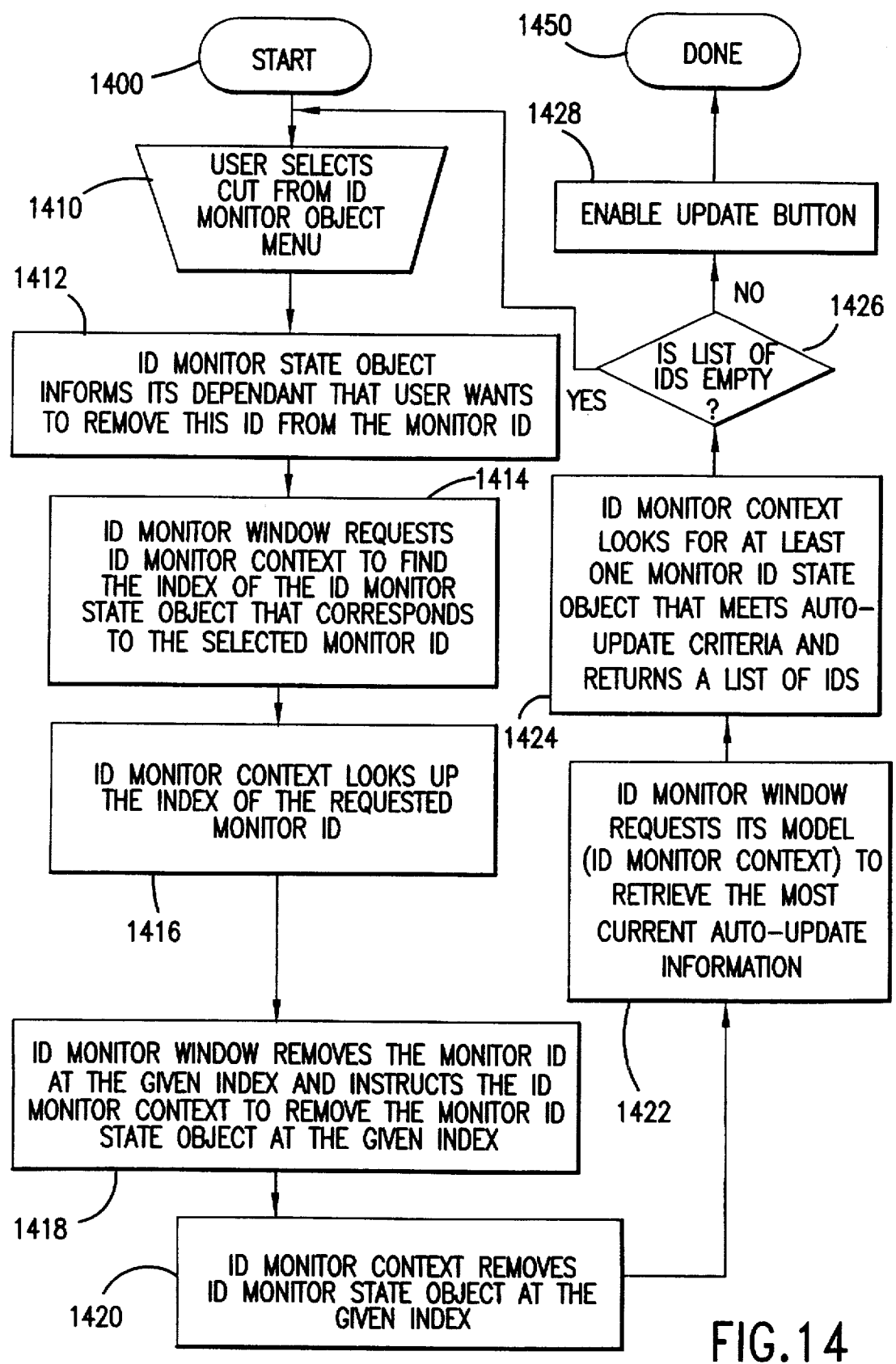
FIG. 14 is a flowchart of the process of removing an ID from the ID monitor window.

As the user deletes ID monitors from ID monitor window 230, ID monitor context keeps track. FIG. 14 is a flowchart of the process of removing an ID monitor form ID monitor window 230. The flow chart in FIG. 14 begins with step 1400, where control immediately passes to step 1410.

In step 1410, the user clicks on Cut from ID monitor object menu 1120 with the mouse to indicate a desire to remove an ID monitor from ID monitor window 230. ID monitor window 230 receives a signal from the user that represents the desire to remove an ID from ID monitor window.

In step 1412, ID monitor state object 150 informs its ID monitor that the user wants to remove the ID monitor from ID monitor window 230.

In step 1414, ID monitor window requests that ID monitor context find eh index of the ID monitor state object that corresponds to the selected ID monitor.

In step 1416, ID monitor context links up the index of he requested ID monitor.

In step 1418, ID monitor window removes the ID monitor at the given index and instructs the ID monitor context to remove the ID monitor state object at the given index.

In step 1420, ID monitor context removes ID monitor state object at the given index.

In step 1422, ID monitor window requests ID monitor context to retrieve the most current auto-update information.

In step 1424, ID monitor context looks for at least one monitor ID state object that meets auto-update criteria and returns a list of ID monitors.

In step 14 26, if the list is not empty, ID monitor window 230 enables update button 250.

The operation of the flowchart in FIG. 14 is complete after step 1426, as indicated by step 1450.

The ID monitor system of the present invention has the feature of storing and recalling a file-based knowledge of instrument state. This feature allows the user to store many instrument configurations, and to recall them when required. ID monitor window state storage and recall affects the ID monitor system as a whole. Thus, state storage and recall will affect ID monitor window and any ID monitor contained in ID monitor window.

The information stored when the user elects to store the global state is in sections. The first section is information stored by ID monitor window and pertains to the geometry of the window. The next section contains the information necessary for ID monitor context to assemble the same list of ID monitors that were present when the user elected to save the global state. In particular, this section contains the number of ID monitors that the ID monitor contained when the global state was stored. It also contains the order in which each individually stored instrument state appears in the file. The second section of the information stored also includes the symbolic names by which each individual contained ID is identified. These entries must correspond to the enclosing application's understanding of instrument resource IDentification.

Figure 15:
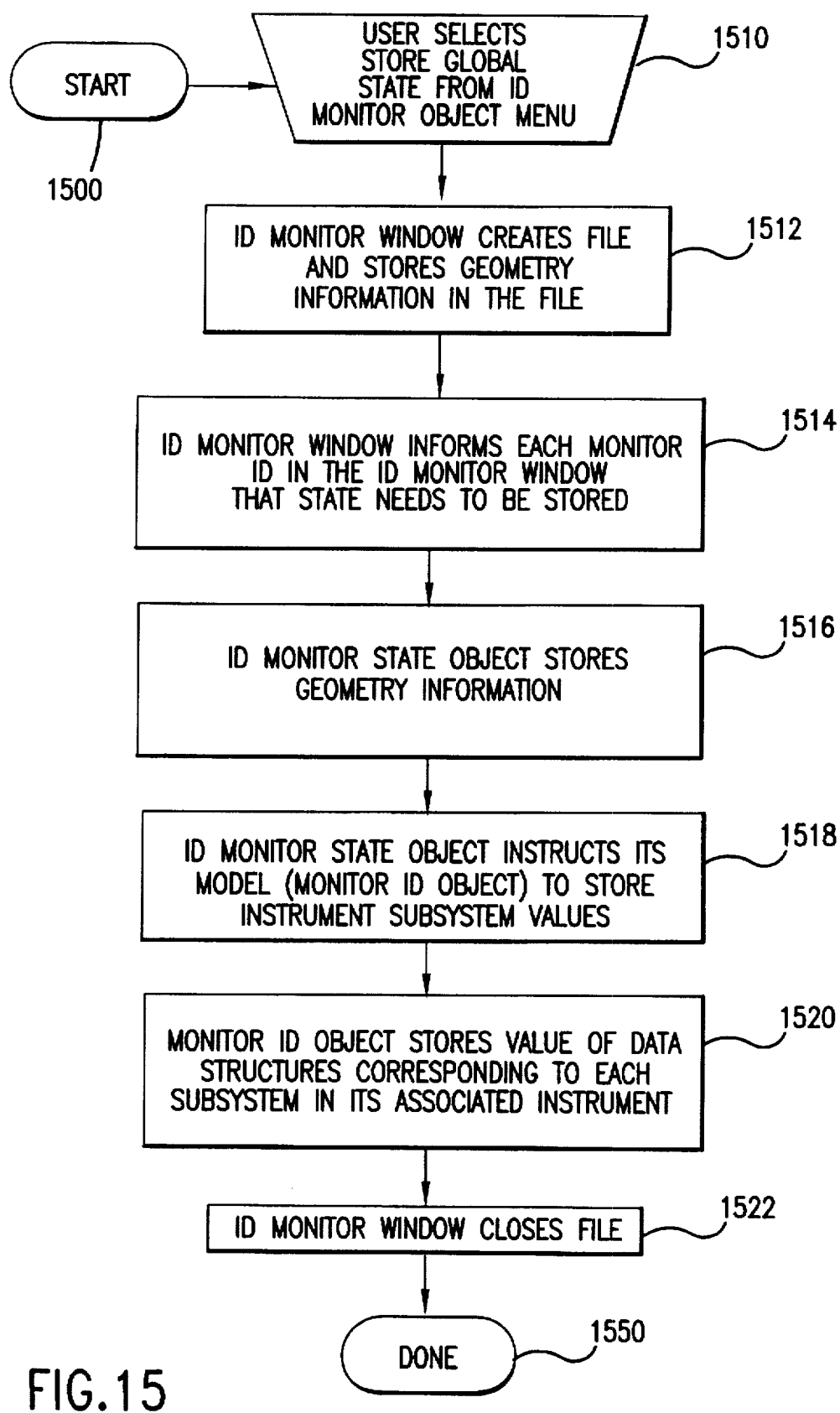
FIG. 15 is a flowchart of the process of storing global state information.

The last section of the information stored when the user elects to store the global state is reserved for each ID monitor to store the individual state of its corresponding instrument. FIG. 15 is a flowchart of the process of storing global state information. The flow chart in FIG. 15 begins with step 1500, where control immediately passes to step 1510.

In step 1510, the user clicks on Store Global State from ID monitor object menu 1120 with the mouse to indicate a desire to store global state information. ID monitor window 230 receives a signal from the user that represents the desire to remove an ID from ID monitor window.

In step 1512, ID monitor window 230 creates a file and stores geometry information in the file.

In step 1514, ID monitor window sends each ID monitor a message indicating that their respective states must be stored.

In step 1516, ID monitor state object stores geometry information.

In step 1518, ID monitor state object instructs its monitor ID object to store instrument subsystem values.

In step 1520, ID monitor object stores the value of the data structures that correspond to each subsystem in its associated instrument.

In step 1522, ID monitor window closes the file.

The operation of the flowchart in FIG. 15 is complete after step 1522, as indicated by step 1550.

Update button 260 and Suspend button 270 of the present invention allow the user to continuously see the state of an instrument as the state changes. Pressing Update button 260 starts the continuous state tracking mode and pressing Suspend button 270 suspends the continuous state tracking.

Id monitor context mus dynamically maintain knowledge of when an automatic update is allowed. The act of pressing Update button 260 causes ID monitor window to message that intent to ID monitor context. Update button 260 and Suspend button 270 are active under conditions described above. Because ID monitor context knows about the capabilities of each contained ID monitor, ID monitor context can subsequently direct each ID monitor to execute its update component when ID monitor context determines that the given ID monitor is in LIVE MODE, has an update component, and has had its Auto-update box 1211 checked.

Figure 16:
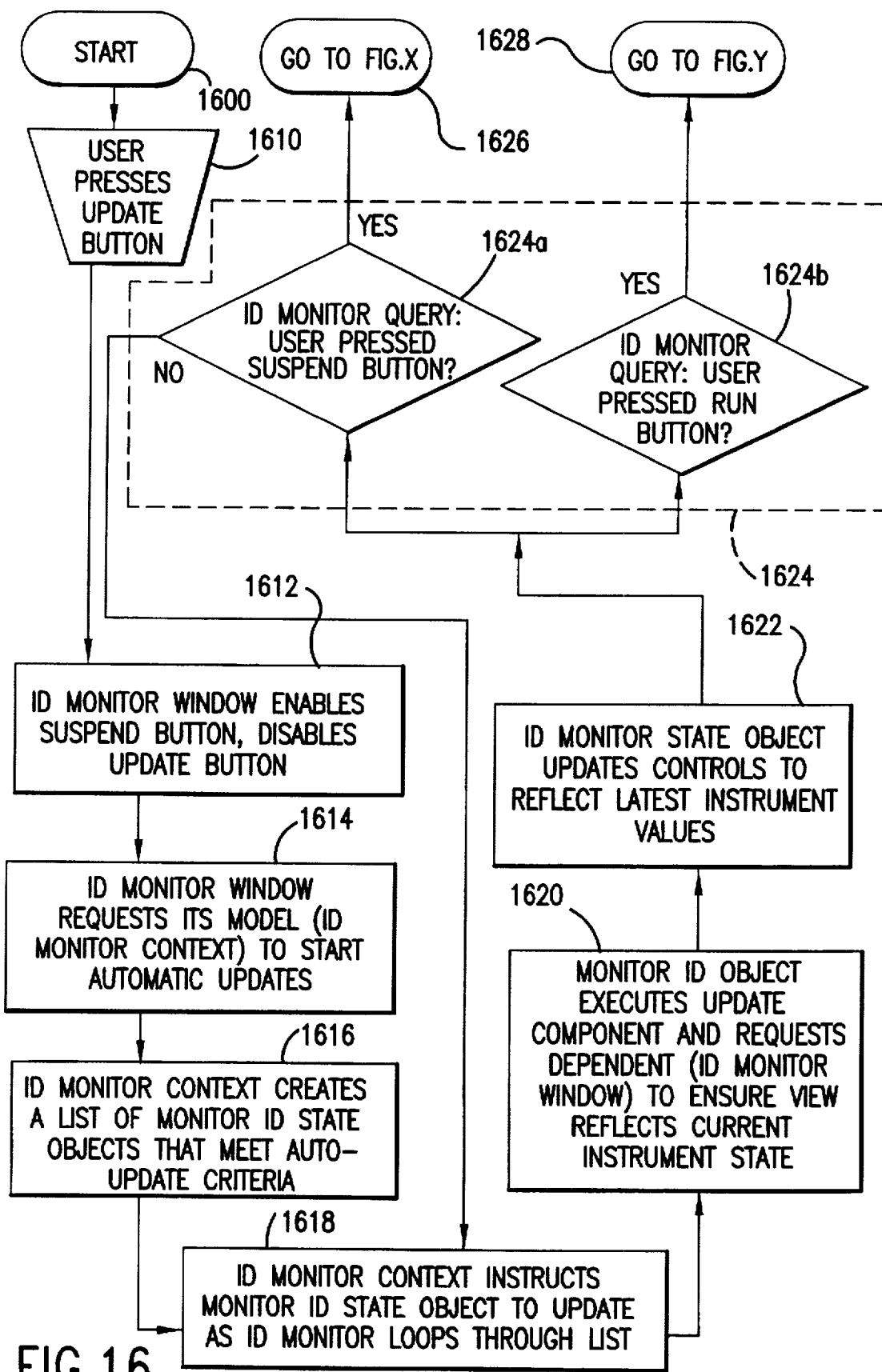
FIG. 16 is a flowchart of the process of performing automatic updates.

FIG. 16 is a flowchart of the process of performing automatic updates of instrument state. The flow chart in FIG. 16 begins with step 1600, where control immediately passes to step 1610.

In step 1610, the user clicks on Update button 260 with the mouse to indicate a desire to update instrument state information. ID monitor window 230 receives a signal from the user that represents the desire to remove an ID from ID monitor window.

In step 1612, ID monitor window enables Suspend button 270 and disable Update button 260.

In step 1614, ID monitor window 230 requests ID monitor context to begin automatically updating instrument states.

In step 1616, ID monitor context creates a list of ID monitor state objects eligible for automatic update.

In step 1618, ID monitor context instructs ID monitor state object to update the instrument state as ID monitor context loops through the list In step 1620, ID monitor object executes update component and requests ID monitor window to ensure ID monitor reflects the current instrument state.

In step 1622, ID monitor state object updates controls to reflect the latest instrument state values.

In step 1624, at the end of each update component, ID monitor context checks to see if the user has pressed Suspend button 270 or run button 222. If the user has pressed Suspend button 270, control passes to step 1710 of FIG. 17 as indicated by step 1626. If the user has pressed Run button 222, control passes to step 1800 of FIG. 18, as indicated by step 1628.

Figure 17:
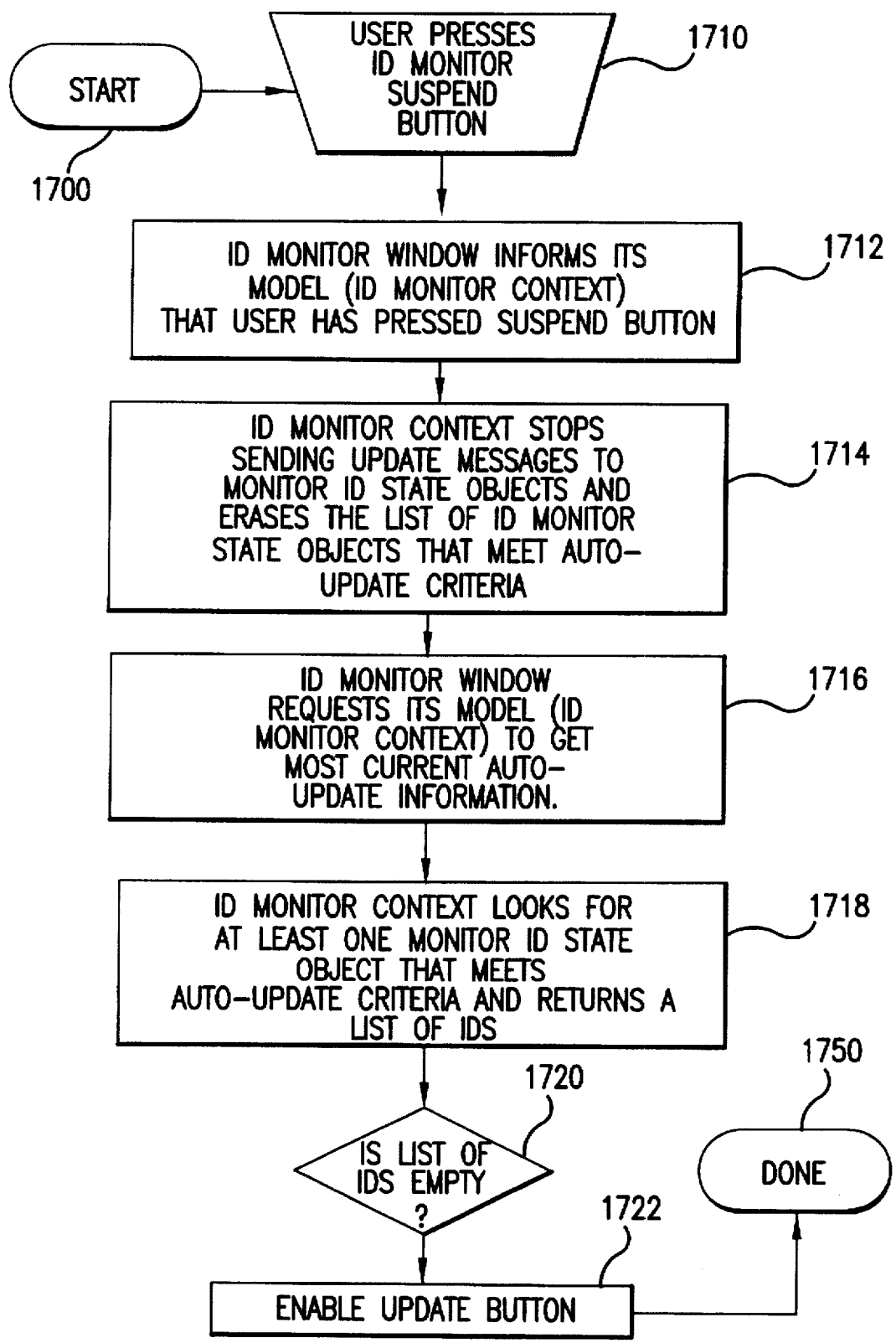
FIG. 17 is a flowchart of the process of suspending automatic updates.

ID monitor context cycles through each appropriate ID monitor, executing its update component until the user presses Suspend button 270 or takes an action which would result in the enclosing application trying to make the use of one of the instruments contained in the ID monitor system. FIG. 17 is a flowchart of the process of suspending automatic updates. The flow chart in FIG. 17 begins with step 1700, where control immediately passes to step 1710.

In step 1710, the user clicks on Suspend button 270 with the mouse to indicate a desire to suspend automatic updates of instrument state. ID monitor window 230 receives a signal from the user that represents the desire to suspend automatic updates of instrument state.

In step 1712, ID monitor window informs ID monitor context that the user has chosen to suspend automatic updates.

In step 1714, ID monitor context stops sending update messages to ID monitor update state objects and erases the list of ID monitor state objects that are eligible for automatic updates.

In step 1716, ID monitor window requests ID monitor context to retrieve the most current auto-update information.

In step 1718, ID monitor context looks for at least one ID monitor state object that is eligible for automatic update and sends a list of ID monitors to ID monitor window. If the list is not empty, ID monitor window enables Update button 260, as indicated by step 1720 and 1722. If the list is empty, control passed to step 1750 and the operation of the flowchart in FIG. 17 is complete after step 1722.

Figure 18:
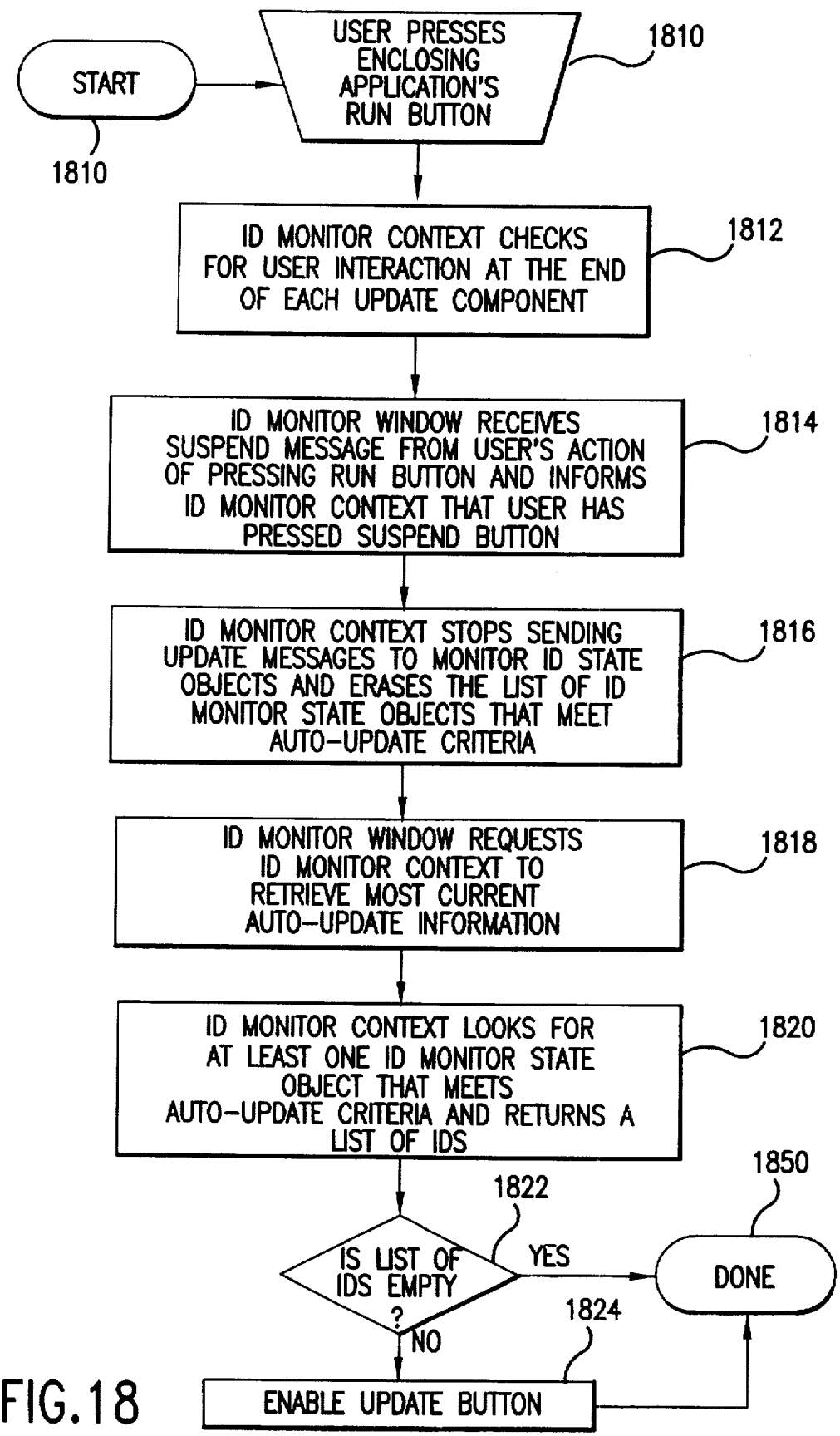
FIG. 18 is a flowchart of the process of running a program while automatic updating is in progress.

FIG. 18 is a flowchart of the process of running a program while automatic updating is in progress. The flow chart in FIG. 18 begins with step 1800, where control immediately passes to step 1810.

In step 1810, the user clicks on Run button 222 with the mouse to indicate a desire to run a program while automatic updating is in progress.

At the end of each executed update component, ID monitor context checks for user interaction, as indicated by step 1812. This is a continuous process.

In step 1814, ID monitor window receives a message indicating that the user has pressed Run button 222, which message is equivalent to that received when the user presses Suspend button 270.

In step 1816, ID monitor context stops sending update messages to ID monitor state objects and erases the list of ID monitor state objects that are eligible for automatic update.

In step 1818, ID monitor window sends a request to ID monitor context to retrieve the most current auto-update information.

In step 1820, ID monitor context looks for at least one ID monitor state object that is eligible for automatic update and returns a list to ID monitor window.

In step 1822 ID monitor window determines if the list is empty. If the list is not empty, ID monitor window enables Update button 260, as indicated by step 1824. If the list is empty, control passed to step 1850 and the operation of the flowchart in FIG. 18 is complete after step 1822.

It is not permissible to allow automatic updates when the enclosing application may interact with the same instruments that are contained in the ID monitor system. Each ID monitor has an update component. An update component is a piece of intelligence that allows the ID monitor to retrieve the most current measurement results quickly. If an enclosing application such as HP VEE were allowed to change the state of the instrument at the same time that the ID monitor was trying to perform an automatic update, a relatively lengthy delay could occur as the ID monitor set the instrument back to the mode appropriate for executing the update component. Given this fact, ID monitor context is responsible for communicating with the closing application when trying to perform automatic updates. Thus, ID monitor context must dynamically maintain knowledge of when an automatic update is allowed.

While the invention has been particularly shown and described with reference to preferred embodiments thereof, it will be understood by those skilled in the art that various changes in form and details may be made therein without departing from the spirit and scope of the invention.

What is claimed is:

1. A method, in a graphical user environment, for automatically updating the state of an instrument, comprising the method steps of:

presenting a menu to a user;

receiving from said user a request to present an instrument descriptor (ID) monitor in the graphical user environment;

retrieving and presenting to said user a list of a plurality of available ID monitors;

receiving a request from the user for at least one of said ID monitor selected from said list to be presented in the graphical user environment;

presenting said ID monitor in an ID monitor window;

enabling automatic updating of said instrument descriptor monitor;

polling the list of available ID monitors to determine eligibility for automatic updating;

updating the eligible ID monitors; and displaying the updating results.

2. A system for continuously tracking the state of a plurality of instruments in a graphical environment, comprising:

a plurality of graphical user interfaces respectively representing a plurality of instruments; wherein
a first graphical user interface includes a first graphical user interface handler, a second graphical user interface, and a third graphical user interface;
said second graphical user interface includes a second graphical user interface handler representing a first instrument; and
said third graphical user interface includes a third graphical user interface handler representing a second instrument;

means for receiving a query from a user, wherein said query represents a request from said user to update the states of said first instrument and said second instrument;

means for sending a query representing said request to update the states of said first instrument and said second instrument, whereby said query is sent from said first graphical user interface to said first graphical user interface handler;

means for displaying in said first graphical user interface said second graphical user interface handler and said third graphical user interface handler;

means for updating the states of said first instrument and second instrument, said first instrument and said second instrument thus having a first and second updated state, respectively; and means for displaying said first updated state and said second updated state in said first graphical user interface.

3. A system according to claim 2, wherein said means for receiving said query from said user further comprises:

means for preventing said user from making a subsequent query representing a second request from said user to update the states of said first instrument and said second instrument.

4. A system according to claim 2, wherein said means for receiving said query from said user further comprises:

means for generating a list including said second graphical user interface handler and said third graphical user interface handler; said list indicating that said first instrument and second instrument are eligible for updating.

5. A system according to claim 2, further comprising means for enabling said user to suspend said updating of said first instrument and said second instrument.

6. A system according to claim 2, further comprising means for running a program during said updating of said first instrument and said second instrument.

7. A system for suspending the continuous tracking of the state of a plurality of instruments, in a graphical environment, comprising:

a plurality of graphical user interfaces respectively representing the plurality of instruments, wherein
a first graphical user interface includes a first graphical user interface handler, a second graphical user interface, and a third graphical user interface;
said second graphical user interface includes a second graphical user interface handler representing a first instrument; and
said third graphical user interface includes a third graphical user interface handler representing a second instrument;
states of said first instrument and said second instrument are being continuously updated;
said first instrument and said second instrument have a first updated state and a second updated state, respectively; and
said first updated state and said second updated state are displayed in said first graphical user interface;

means for receiving a query from a user, wherein said query represents a request from said user to suspend updating of the states of said first instrument and said second instrument;

means for sending a query representing said request to suspend said updating of the states of said first instrument and said second instrument, whereby said query is sent from said first graphical user interface to said first graphical user interface handler;

means for erasing said display in said first graphical user interface of said first updated state and said second updated state;

means for retrieving a current state of said first instrument and a current state of second instrument, said first instrument and said second instrument thus having a first and second current state, respectively; and means for enabling said user to make a query representing a request from said user to update the states of said first instrument and said second instrument.

8. A system according to claim 7, wherein said means for receiving said query from said user further comprises:

means for generating a list including a fourth graphical user interface handler and a third graphical user interface handler; said list indicating that a third instrument and fourth instrument are eligible for updating.

9. A system according to claim 7, further comprising means for enabling said user to suspend said updating of said first instrument and said second instrument.

10. A system according to claim 7, further comprising means for running a program during said updating of said first instrument and said second instrument.

11. A system, in a graphical environment, for tracking states of a plurality of instruments, utilizing a graphical programming language, comprising:

a first level graphical user interface, comprising:
a plurality of second level graphical user interfaces;
a first pull down menu; and
an update button;

a first level graphical user interface handler coupled to said first level graphical user interface, said first level graphical user interface handler being capable of communicating with first, second, third, and fourth instruments through the graphical environment;

a first second level graphical user interface coupled to said first level graphical user interface, said second graphical user interface representing a first one of said plurality of instruments;

a first second level graphical user interface handler coupled to said first second level graphical user interface;

a second second level graphical user interface coupled to said first level graphical user interface, said second second level graphical user interface representing a second one of said plurality of instruments;

a third second level graphical user interface handler coupled to said third second level graphical user interface;

a third second level graphical user interface coupled to said first level graphical user interface, said third second level graphical user interface representing a third one of said plurality of instruments;

means for transmitting a query issued by a user representing a request to update the states of said first, second, third, and fourth instruments from said first level graphical user interface to said first level graphical user interface handler; and means for communicating said query from said first level graphical user interface handler to said first, second, third, and fourth second level graphical user interface handlers;

whereby said first, second, third, and fourth second level graphical user interface handlers update the states of said first, second, third, and fourth instruments;

whereby said first level graphical user interface handler retrieves said states of first, second, third, and fourth from said first, second, third, and fourth second level graphical user interface handlers; and whereby said first level graphical user interface displays the updated states of said first, second, third, and fourth instruments.

* * * * *